United States Patent
Sundberg et al.

(10) Patent No.: US 10,356,795 B2
(45) Date of Patent: *Jul. 16, 2019

(54) TRANSMITTING DEVICE, RECEIVING DEVICE, CONTROLLING NODE, AND METHODS THEREIN, FOR TRANSMITTING A BLOCK TO THE RECEIVING DEVICE

(71) Applicant: Telefonaktiebolaget LM Ericsson (publ), Stockholm (SE)

(72) Inventors: Mårten Sundberg, Årsta (SE); Stefan Eriksson Löwenmark, Hässelby (SE); Olof Liberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/120,785

(22) Filed: Sep. 4, 2018

(65) Prior Publication Data

US 2018/0376472 A1    Dec. 27, 2018

Related U.S. Application Data

(63) Continuation of application No. 15/950,272, filed on Apr. 11, 2018, now Pat. No. 10,098,126, which is a
(Continued)

(51) Int. Cl.
*H04W 72/04* (2009.01)
*H04L 1/00* (2006.01)
(Continued)

(52) U.S. Cl.
CPC ......... *H04W 72/048* (2013.01); *H04L 1/0038* (2013.01); *H04L 1/0057* (2013.01);
(Continued)

(58) Field of Classification Search
CPC .... H04W 72/48; H04L 1/0057; H04L 1/0071; H04L 1/0079; H04L 1/0084; H04L 1/08; H04L 5/0048; H04L 1/0038
See application file for complete search history.

(56) References Cited

U.S. PATENT DOCUMENTS 7,286,574 B2  10/2007 Parolari
7,289,574 B2  10/2007 Parolari
(Continued)

FOREIGN PATENT DOCUMENTS

CN    1505880 A    6/2004
CN    101674604 A   3/2010
(Continued)

OTHER PUBLICATIONS

"3GPP TS 45.003 V12.0.0", 3rd Generation Partnership Project; Technical Specification Group GSM/EDGE Radio Access Network; Channel coding (Release 12), Nov. 2013, pp. 1-325.
(Continued)

*Primary Examiner* — Melvin C Marcelo
(74) *Attorney, Agent, or Firm* — Murphy, Bilak & Homiller, PLLC

(57) ABSTRACT

Embodiments include methods performed by a receiving device configured for operation in a communications network. The methods include receiving, from a transmitting device in the network, four bursts comprising a block mapped according to a selected block format, wherein the block comprises a plurality of data and header bits. In some embodiments, the block further comprises Stealing Flag bits and Uplink State Flag bits. The methods also include determining whether the selected block format corresponds to a first block format in which the plurality of data and header bits are repeated in a corresponding plurality of same first positions in all four bursts. The methods also include demodulating the plurality data and header bits based on the
(Continued)

determination of whether the selected block format corresponds to the first block format. Embodiments also include receiving devices comprising a receiver and a processor configured to perform operations corresponding to the exemplary methods.

22 Claims, 11 Drawing Sheets

Related U.S. Application Data continuation of application No. 15/587,031, filed on May 4, 2017, now Pat. No. 9,974,082, which is a continuation of application No. 14/910,951, filed as application No. PCT/SE2015/051362 on Dec. 17, 2015, now Pat. No. 9,680,609.

(60) Provisional application No. 62/108,109, filed on Jan. 27, 2015.

(51) Int. Cl.
*H04L 1/08* (2006.01)
*H04L 5/00* (2006.01)

(52) U.S. Cl.
CPC .......... *H04L 1/0071* (2013.01); *H04L 1/0079* (2013.01); *H04L 1/0084* (2013.01); *H04L 1/08* (2013.01); *H04L 5/0048* (2013.01)

(56) References Cited

U.S. PATENT DOCUMENTS

| | | | |
|---|---|---|---|
| 9,680,609 | B2 | 6/2017 | Sundberg et al. |
| 2004/0253958 | A1* | 12/2004 | Chang .................. H04L 1/0003 455/445 |
| 2008/0285523 | A1 | 11/2008 | Bjorken |
| 2009/0086686 | A1 | 4/2009 | Rudolf et al. |
| 2010/0027727 | A1 | 2/2010 | Kelley |
| 2010/0110946 | A1 | 5/2010 | Diachina et al. |
| 2013/0034054 | A1 | 2/2013 | Wu et al. |
| 2014/0036934 | A1 | 2/2014 | Buckley et al. |
| 2014/0064191 | A1 | 3/2014 | Aghili et al. |
| 2014/0301318 | A1 | 10/2014 | Luo et al. |
| 2016/0036607 | A1 | 2/2016 | Stephens |
| 2016/0262138 | A1 | 9/2016 | Sundberg et al. |
| 2017/0238303 | A1 | 8/2017 | Sundberg et al. |

FOREIGN PATENT DOCUMENTS

| | | |
|---|---|---|
| EP | 1093315 A2 | 4/2001 |
| EP | 3251242 A1 | 12/2017 |
| WO | 9914963 A2 | 3/1999 |
| WO | 0074296 A1 | 12/2000 |
| WO | 2016122371 A1 | 8/2016 |

OTHER PUBLICATIONS

"New Study Item on Cellular System Support for Ultra Low Complexity and Low Throughput Internet of Things", Vodafone Group Plc., 3GPP TSG-GERAN Meeting #62, GP-140421, Valencia, Spain, May 26-30, 2014, pp. 1-6.

* cited by examiner

Phase drift

Phase drift

TRANSMITTING DEVICE, RECEIVING DEVICE, CONTROLLING NODE, AND METHODS THEREIN, FOR TRANSMITTING A BLOCK TO THE RECEIVING DEVICE

RELATED APPLICATIONS

This application is a Continuation of U.S. application Ser. No. 15/950,272 filed Apr. 11, 2018, which is a Continuation of U.S. application Ser. No. 15/587,031 filed May 4, 2017, which is a Continuation of U.S. application Ser. No. 14/910,951 filed Feb. 8, 2016, which is a U.S. national-phase entry of International Appl. PCT/SE2015/051362 filed Dec. 17, 2015, which claims priority to U.S. Provisional Appl. No. 62/108,109 filed Jan. 27, 2015.

TECHNICAL FIELD

The present disclosure relates generally to a transmitting device and methods performed thereby for transmitting a block to a receiving device. The present disclosure also relates generally to a receiving device and methods performed thereby for receiving the transmitted block from the transmitting device. The present disclosure further relates generally to a controlling node for selecting a block format for transmission by the transmitting device to the receiving device. The present disclosure additionally relates generally to computer programs and computer-readable storage mediums, having stored thereon the computer programs to carry out these methods.

BACKGROUND

Communication devices such as wireless devices are also known as e.g. User Equipments (UE), mobile terminals, wireless terminals and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone and/or between a wireless device and a server via a Radio Access Network (RAN) and possibly one or more core networks, comprised within the wireless communications network.

Wireless devices may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which is divided into cell areas, wherein each cell area may be served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

Extended Coverage

Cellular systems continuously improve the network performance by introducing new features and functionality. In GP-140421, "New SI on Cellular System Support for Ultra Low Complexity and Low Throughput Internet of Things", GERAN#62, Vodafone, a new Study Item within 3rd Generation Partnership Project (3GPP) was started that aims, amongst other things, to improve the DL and UL radio coverage of General Packet Radio Service (GPRS)/Enhanced GPRS (EGPRS) by up to 20 dB. A way to enhance coverage may be to use blind transmissions of the same radio block with both the transmitter and receiver, being aware of how many repetitions may be used and how those repetitions may be transmitted in the overall frame structure. A radio block, which may be referred to herein also as a "block", may be understood as a well confined structure for data and control message transfer that may be distributed over one or more physical resources, referred to as "bursts". Herein, a "block" may also refer to a structure for transfer of synchronization signals and information. A "burst" may be understood as a well-defined physical resource onto which the fields of the block are mapped. Blind transmissions may be understood as a predetermined number of transmissions to support extended coverage. The transmissions may be sent blindly, that is, without feedback from the receiving end. To maximize the processing gain at the receiver, phase coherency at the transmitter, between repetitions, may be required.

Current Block Format

A block may be comprised of bits. A bit may be understood as the smallest unit of information in a digital information system. A bit is most commonly represented as either a 0 or a 1. The bits comprising the block may comprise information of different types. The types of information may comprise: training sequence, stealing flags, data and header and uplink state flag or USF. The types of information may be organized in a particular manner. The manner in which the different types of information are organized is known as the format of the block, or block format. The types of information may be understood to be organized in fields. A field may be understood as a group of bits in a message carrying a type of information. A field may be comprised of a contiguous or non-contiguous group, or groups of bits when mapped onto the physical resource, that is, the burst(s).

The block format used for PACCH and PDTCH today in GSM may be divided into Stealing Flags (SFs), Uplink State Flags (USFs) and remainder of the block. The remainder of the block may be different depending on whether the block is a PACCH block or a PDTCH block, but may consist typically of a header and a data part, e.g., RLC/MAC header and RLC or control data, and its bit-specific content differs from burst to burst. Since a radio block may be divided into 4 bursts the overall interleaving depth, which may be understood herein as the range over which an information field is distributed, of the data and header part is four bursts.

A USF may be understood as an identifier in an UL scheduling mechanism. The identifier may schedule a certain MS in a next UL radio block period. Among all MSs monitoring a DL radio block, only the single MS assigned the USF signaled in the DL radio block may be allowed to transmit in the next UL radio block period. For GMSK modulation, which is the modulation scheme used by GPRS devices, the USF bits may be mapped onto different bit positions in the four different bursts of a block, as shown in Table 1.

TABLE 1

GMSK USF bit mapping

| Burst | USF bit position |
|---|---|
| 0 | 0, 51, 102 |
| 1 | 100, 35, 86 |
| 2 | 84, 19, 70 |
| 3 | 68, 3, 52 |

A Stealing Flag may be understood as a signal for the type of radio block transmitted. The SF bits may be mapped onto the same bit positions in each burst, namely the two bit positions on either side of the training sequence. A training sequence may be understood as predefined sequence know by both transmitter and received, whose purpose may be understood as e.g. to facilitate estimation of the radio channel over which a burst may be transmitted.

The different fields of the current block format, also referred to herein as the legacy block format, are shown in FIG. 1, which is a schematic illustration of the current or existing block format. In the Figure, each burst is represented by a different row of bits. The top row 200 represents the burst number 0, the second row 201 represents the burst number 1, the third row 202 represents the burst number 2, and the fourth row 203 represents the burst number 3. A bit is represented in the Figure by a vertical rectangle. An individual bit 210 is marked. The type of information carried by each bit is illustrated with different patterns, as shown in the legend of the Figure. 58 bits are on each side of the training sequence bits, which are flanked by the SF bits. The USF bits are located in the bit positions listed in Table 1. The remaining bits correspond to data and header type of information. All the bits in any single burst of the bursts 200, 201, 202, 203 comprising the Training Sequence are referred to herein as the Training Sequence field 220. All the bits in the block comprising the SF are referred to herein as the SF field 230. All the bits in the block comprising data are referred to herein as the data field. All the bits in the block comprising the header are referred to herein as the header field. The data and header fields may be referred to herein together as the data and header fields 240, as shown in FIG. 1. All the bits in the block comprising the USF are referred to herein as the USF field 250.

Radio transmissions may be exposed to various impairments. One such impairment is the so-called frequency offset. A frequency offset may be understood as an offset between the frequency used by the transmitter and the receiver. A receiving device of a radio transmission may try to compensate for such frequency offset by detecting the offset and compensate for the same.

Blind transmissions of the same radio block have been suggested as a way to enhance radio coverage in existing systems because these if coherently combined in, they may improve the signal to noise ratio, e.g., with up to 3 dB per doubling of repetitions, and thereby increase the likelihood of correctly decoding a message. However, if such a frequency offset is not correctly estimated by the receiving device with existing methods, this may destroy the coherency and degrade the receiver processing gain when combining the repetitions. The processing gain in this context may be understood as the coverage performance improvement achieved by receiver algorithms. As a consequence the receiving device may not be reached in the extended coverage scenario, as an extension of the coverage may not be achieved.

When using multiple blind transmissions, a.k.a., blind physical layer transmissions or just blind transmissions, the receiver, such as a receiving device, may typically combine and accumulate several of these transmissions before calling the demodulator, and hence before it attempts to demodulate and decode the block. In this accumulation of multiple transmissions, there may be a need to do the accumulation in a particular way, so called coherently, in order not maximize the processing gain from these transmissions. In this process, a too high frequency offset in the reception may be detrimental to the overall performance. This is because a frequency offset leads to a phase drift over time which negatively impacts the possibility to combine the samples from repeated bursts in order to achieve a desired processing gain. Hence, there may be, typically, an attempt from the receiver to compensate for any frequency offset between transmissions that may result in a phase shift over time in the baseband representation of the signal.

To address this, an excessive number of repetitions may be needed, which results in a poor utilization of available radio resources. Furthermore, with an improper estimation of the frequency offset in the reception, the same frequency offset may apply when the receiver is transmitting in the opposite direction. Hence, an improper estimation in one direction may impact performance in both UL and DL. Therefore, existing methods for extended coverage result in poor performance of the wireless communications network.

Backwards Compatibility

Improper estimation of the frequency offset is not the only problem associated with the introduction of devices supporting extended coverage in a network. When introducing new features into a network, it may often be necessary to follow the requirement of backwards compatibility, i.e., that the previous network operation may not be impacted negatively by the introduction of the new feature.

This is because while the set of radio resources in the network may stay the same, devices of e.g., different capabilities depending on whether they support or not the new feature, may need to be allocated or scheduled on a common set of radio resources. That is, they may need to be multiplexed, or scheduled at different time instances, on the same time slot, or set of time slots.

In the particular case of Global System for Mobile Telephony (GSM)/General Packet Radio Service (GPRS) networks, for example, when introducing Enhanced General Packet Radio Service (EGPRS), providing as little impact as possible on the GPRS traffic was an important factor to take into account. One specific aspect that needed attention was the possible multiplexing of legacy GPRS devices and EGPRS devices onto the same physical resources, and that monitoring by legacy devices of the DL channel to see if they are scheduled in the UL, by the reading of the Uplink State Flag (USF) flag, was impacted to the least extent possible. As stated earlier, the USF signaled in the DL radio block may identify the single MS assigned to it that may be allowed to transmit in the next UL radio block period.

During a temporary block flow or TBF, a connection established between a MS and a BS to enable packet exchanges between them in GPRS networks, the USF may be carried by two different channels, the Packet Data Traffic Channel (PDTCH), which may carry user data, and the Packet Associated Control Channel (PACCH), which may carry control signaling that may be needed to support the user data flow.

The problem of backwards compatibility is not new to GSM/EDGE. When introducing EGPRS, only partial multiplexing between GPRS and EGPRS devices was achieved. This means that both GPRS and EGPRS devices may be assigned the same resources in the network. However, both DL and UL scheduling of GPRS devices using 8-ary Phase Shift Keying (8PSK) modulation, the new modulation scheme introduced with EGPRS, is not possible, because the GPRS devices may only support Gaussian Minimum Shift Keying (GMSK) modulation. Still, the block format for EGPRS when using GMSK modulation was done to ensure that GPRS mobiles could read it.

This was specifically achieved by the BTS coding the Stealing Flags (SF) for PDTCH indicating CS-4 from GPRS. A GPRS device may therefore be able to interpret the SF as well as read the USF transmitted of EGPRS blocks transmitted with GMSK modulation. This is reflected in 3GPP TS 45.003 v12.0.0, "Channel coding", for the coding description of MCS-1, which also applies to MCS-2, -3 and -4, where it may be noted that:

"Note: For a standard GPRS MS, bits $q(0), \ldots, q(7)$ indicates that the USF is coded as for CS-4."

$q(0), \ldots, q(7)$ is here referring to the Stealing Flag bits.

According to the foregoing, lack of backwards compatibility with existing networks when introducing the extended coverage feature into a network may negatively impact the performance of the network due to unnecessary restrictions being imposed on to the network resource allocation and scheduling method, as e.g., multiplexing of devices supporting and not supporting extended coverage may not be possible.

Moreover, the frequency error offset associated with the blind repetitions used to extend the coverage in a network may result a failure to reach the devices that are aimed to be reached, hence degrading the performance of the network.

SUMMARY

It is therefore an object of embodiments herein to improve the performance of a communications network by providing improved methods of transmitting information to a receiving device. It is a particular object of embodiments herein to improve the performance of a communications network by providing improved methods of transmitting information to a receiving device in an extended coverage scenario.

According to a first aspect of embodiments herein, the object is achieved by a method performed by a transmitting device. The method is for transmitting a block to a receiving device. The transmitting device and the receiving device operate in a wireless communications network. The transmitting device transmits a block to the receiving device. The block comprises four bursts. The four bursts further comprise Uplink State Flag (USF), Stealing Flag (SF), and data and header fields, wherein the USF and the SF fields are interleaved and mapped over the four bursts. The data and header fields are interleaved over one burst but repeated over the four bursts. The data and header fields are overlapping with and overridden by bits from the USF field in different positions in each burst.

According to a second aspect of embodiments herein, the object is achieved by a method performed by the receiving device. The method is for receiving the transmitted block from the transmitting device. The transmitting device and the receiving device operate in the wireless communications network. The receiving device receives a block from the transmitting device. The block comprises four bursts. The four bursts further comprise USF, SF and data and header fields. The USF and the SF fields are interleaved and mapped over the four bursts. The data and header fields are interleaved over one burst but repeated over the four bursts. The data and header fields are overlapping with and overridden by bits from the USF field in different positions in each burst.

According to a third aspect of embodiments herein, the object is achieved by a method performed by a controlling node. The method is for selecting the block format for transmission by the transmitting device to the receiving device. The controlling node, the transmitting device, and the receiving device operate in the wireless communications network. The controlling node selects a block format for transmission by the transmitting device to the receiving device. The block format comprises four bursts. The four bursts further comprise USF, SF and data and header fields. The USF and the SF fields are interleaved and mapped over the four bursts. The data and header fields are interleaved over one burst but repeated over the four bursts. The data and header fields are overlapping with and overridden by bits from the USF field in different positions in each burst. The controlling node sends, to the transmitting device, an indication for the selected block format.

According to a fourth aspect of embodiments herein, the object is achieved by the transmitting device configured to transmit the block to the receiving device. The transmitting device and the receiving device are configured to operate in the wireless communications network. The transmitting device is further configured to transmit the block to the receiving device. The block comprises four bursts. The four bursts further comprise USF, SF and data and header fields. The USF and the SF fields are interleaved and mapped over the four bursts. The data and header fields are interleaved over one burst but repeated over the four bursts. The data and header fields are overlapping with and overridden by bits from the USF field in different positions in each burst.

According to a fifth aspect of embodiments herein, the object is achieved by the receiving device configured to receive the transmitted block from the transmitting device. The transmitting device and the receiving device are configured to operate in the wireless communications network. The receiving device is further configured to receive the block from the transmitting device. The block comprises four bursts. The four bursts further comprise USF, SF and data and header fields. The USF and the SF fields are interleaved and mapped over the four bursts. The data and header fields are interleaved over one burst but repeated over the four bursts. The data and header fields are overlapping with and overridden by bits from the USF field in different positions in each burst.

According to a sixth aspect of embodiments herein, the object is achieved by a controlling node configured to select the block format for transmission by the transmitting device to the receiving device. The controlling node, the transmitting device, and the receiving device are configured to operate in the wireless communications network. The controlling node is further configured to select the block format for transmission by the transmitting device to the receiving device. The block format comprises four bursts. The four bursts further comprise USF, SF and data and header fields. The USF and the SF fields are interleaved and mapped over the four bursts. The data and header fields are interleaved over one burst but repeated over the four bursts. The data and header fields are overlapping with and overridden by bits from the USF field in different positions in each burst. The controlling node sends, to the transmitting device 101, an indication for the selected block format.

According to a seventh aspect of embodiments herein, the object is achieved by a computer program, comprising instructions which, when executed on at least one processor, cause the at least one processor to carry out the method performed by the transmitting device.

According to an eighth aspect of embodiments herein, the object is achieved by a computer-readable storage medium, having stored thereon the computer program, comprising instructions which, when executed on at least one processor, cause the at least one processor to carry out the method performed by the transmitting device.

According to a ninth aspect of embodiments herein, the object is achieved by a computer program, comprising instructions which, when executed on at least one processor, cause the at least one processor to carry out the method performed by the receiving device.

According to a tenth aspect of embodiments herein, the object is achieved by a computer-readable storage medium, having stored thereon the computer program, comprising instructions which, when executed on at least one processor, cause the at least one processor to carry out the method performed by the receiving device.

According to an eleventh aspect of embodiments herein, the object is achieved by a computer program, comprising instructions which, when executed on at least one processor, cause the at least one processor to carry out the method performed by the controlling node.

According to a twelfth aspect of embodiments herein, the object is achieved by a computer-readable storage medium, having stored thereon the computer program, comprising instructions which, when executed on at least one processor, cause the at least one processor to carry out the method performed by the controlling node.

By the transmitting device transmitting the block to the receiving device with the described format, that is, the block comprising four bursts, the four bursts further comprising USF, SF and data and header fields, wherein the USF and the SF fields are interleaved and mapped over the four bursts, wherein the data and header fields are interleaved over one burst but repeated over the four bursts, and wherein the data and header fields are overlapping with and overridden by bits from the USF field in different positions in each burst, effective frequency offset estimation is allowed. This in turn may help to optimize the performance in extended coverage and help in following transmissions/receptions by having a low frequency offset. Moreover, backwards compatibility with legacy devices multiplexed on the same resources may be maintained.

BRIEF DESCRIPTION OF THE DRAWINGS

Examples of embodiments herein are described in more detail with reference to the accompanying drawings, in which.

DETAILED DESCRIPTION

Terminologies

Figure 1:
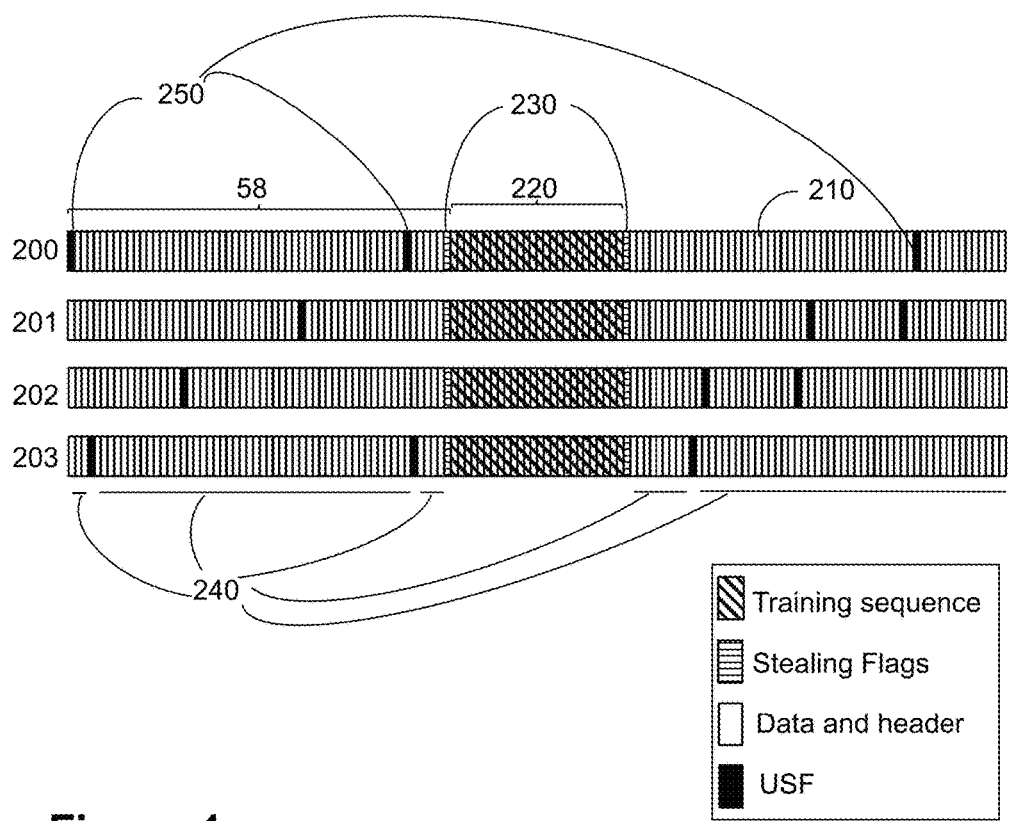
FIG. 1 is a schematic illustration of the current block format.

The following commonly terminologies are used in the embodiments and are elaborated below:

Radio network node: In some embodiments the non-limiting term radio network node is more commonly used and it refers to any type of network node serving a wireless device and/or connected to other network node or network element or any radio node from where a wireless device receives signal. Examples of radio network nodes are base transceiver station (BTS), Node B, base station (BS), multi-standard radio (MSR) radio node such as MSR BS, eNode B, network controller, radio network controller (RNC), base station controller, relay, donor node controlling relay, Access Point (AP), transmission points, transmission nodes, RRU, RRH, nodes in distributed antenna system (DAS) etc.

Network node: In some embodiments a more general term "network node" is used and it may correspond to any type of radio network node or any network node, which communicates with at least a radio network node. Examples of network node are any radio network node stated above, core network node (e.g. MSC, MME etc.), O&M, OSS, SON, positioning node (e.g. E-SMLC), MDT etc.

Wireless device: In some embodiments the non-limiting term wireless device is used and it refers to any type of wireless device communicating with a radio network node in a cellular or mobile communication system. Examples of wireless device are target device, device to device mobile stations, machine type mobile stations or mobile stations capable of machine to machine communication, PDAs, iPAD, Tablet, mobile terminals, smart phone, laptop embedded equipped (LEE), laptop mounted equipment (LME), USB dongles etc.

Note that although terminology from the 3rd Generation Partnership Project (3GPP) GERAN has been used in this disclosure to exemplify the embodiments herein, this should not be seen as limiting the scope of the embodiments herein to only the aforementioned system. Other wireless systems, including WCDMA, WiMax, and UMB may also benefit from exploiting the ideas covered within this disclosure.

As part of the development of embodiments herein, a problem will first be identified and discussed.

As mentioned earlier, blind transmission of the same radio block have been suggested as a way to enhance radio coverage in existing systems. However, for optimal performance using blind transmissions a proper estimation of the frequency offset at the receiver may be necessary. In order to efficiently estimate the frequency offset, and compensate for it at a low Signal-to-Noise Ratio (SNR), which may be the case when operating in extended coverage, a commonly used estimator may be based on the knowledge that two or more identical signals have been transmitted with a known separation in time. If it is assumed that two of those are for example designated as s1 and s2, the frequency offset may be estimated by taking sum(s1*s2'), where the '-operator is the complex conjugate of the signal. The resulting complex vector may have a phase, which is an estimation of the phase drift between s1 and s2, and hence, by knowing the time separation between the two transmissions, the phase drift over time, and hence the frequency offset may be estimated, by e.g., the receiving device.

However, with a large enough separation in time, e.g., T, the estimation of frequency offset may not be done in an unambiguous way due to the $2\pi$ periodicity of the phase. A detected phase $\theta$ at time T may be a result of a range of frequency offset $(\theta \pm 2\pi N)/T$ radians, where N is an arbitrary integer.

A correct estimation of the frequency offset may not only be important for the receiver side in a device, but also for the transmitter side of the device so that it may correct its own frequency drift continuously.

A typical data transmission by a device such as a MS may be take place in the following manner:
1. The device may synchronize to a cell and correct its frequency from the synchronization channel(s);
2. The device may read system information on a broadcast channel to determine, among other things, that it is allowed to access the network and what transmit power to use;
3. The device may send a Random Access to the network, that is, a network node, to ask for resources;
4. The network may assign resources to the device by a control block on the DL;
5. The device may transmit on the resources and wait for a control message on the DL to know the status of the transmission;
6. Step 3, 4 is may be repeated until the data transmission is finished.

Figure 2:
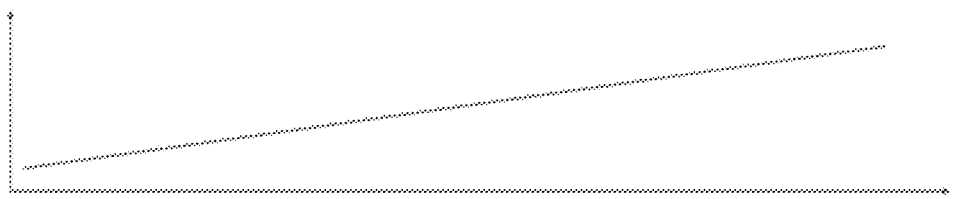
FIG. 2 is a schematic diagram illustrating frequency offset drift with initial and continuous compensation.
Figure 2:
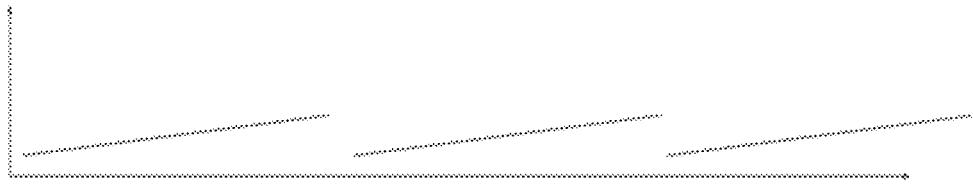

With the described procedure, the frequency drift may only be corrected at the synchronization to the cell, and possibly during the system information acquisition, but may then drift during the data transfer. FIG. 2 is a schematic diagram illustrating a frequency offset drift with initial compensation in the top graph, according to existing methods. In the top graph only step 1 above is executed, so the frequency estimation and correction is only accomplished during the initial step 1 just described. As may be appreciated in the top graph in the Figure, the rate of the phase drift is increasing with time, as shown by the positive slope, which implies a larger frequency offset. However, if the control block, that is the block in e.g., the PACCH, on the DL is designed for effective frequency offset estimate, so the device may compensate for it, the drift may only occur during a short period, and hence be compensated for with the receipt of every DL control message transmission, as shown by the bottom graph in FIG. 2. The bottom graph in FIG. 2 illustrates frequency offset drift with continuous compensation. As in the top graph of the Figure, the rate of the phase drift is increasing with time, as shown by the positive slope. In the bottom graph, the frequency offset may be corrected by the receiver every time a control block, e.g., a PACCH, is received per step 5 above. In the bottom graph, when the frequency offset is compensated, the frequency offset is lowered or completely removed, which is showed as a discontinuation of the curve. When the device starts to transmit after the frequency offset compensation, the drift is increased again, shown by the positive slope, but does not reach values as high as the case without frequency offset compensation, as shown in the top part of Figure.

In conclusion, from FIG. 2 it may be understood that using a simple approach by just repeating the current control block on the DL by blind repetition may imply that the same bursts blindly repeated may be separated by a distance too far in time, for the receiver to unambiguously and effectively determine the frequency offset. Ensuring a smaller spacing in time may ease the frequency offset estimation, and also the range of frequency offsets possible to detect.

Embodiments herein will now be described, which address the aforementioned issues by providing methods that allow for effective frequency offset estimation in extended coverage. In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments. Several embodiments are comprised herein. More specifically, the following are transmitting device related embodiments, receiving device related embodiments, and controlling node related embodiments.

Figure 3:
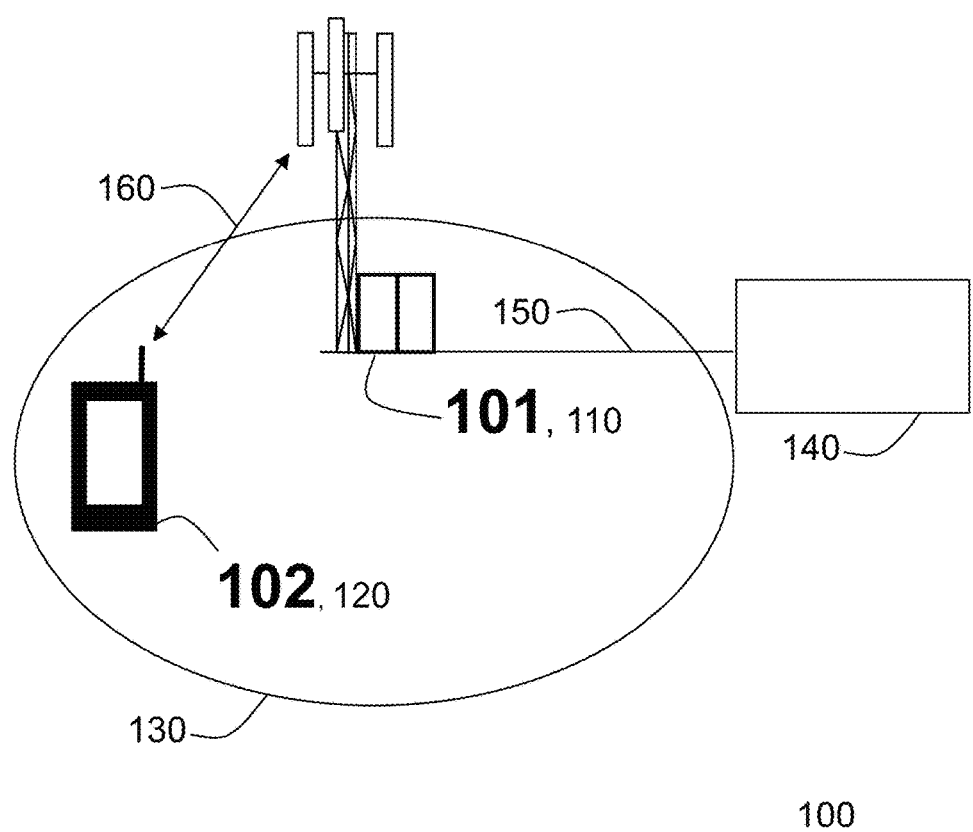
FIG. 3 is a schematic diagram illustrating an example of a wireless communications network, according to some embodiments.

FIG. 3 depicts an example of a wireless communications network 100, sometimes also referred to as a cellular radio system, cellular network or wireless communications system, in which embodiments herein may be implemented. The wireless communications network 100 may for example be a network such as a Global System for Mobile communications (GSM) network, GSM/Enhanced Data Rate for GSM Evolution (EDGE) Radio Access Network (GERAN) network, EDGE network or a network comprising of a combination of Radio Access Technologies (RATs) such as e.g. Multi-Standard Radio (MSR) base stations, where GSM/EDGE is included as one of the RATs supported. Thus, although terminology from 3GPP GERAN may be used in this disclosure to exemplify embodiments herein, this should not be seen as limiting the scope of the embodiments herein to only the aforementioned system.

The wireless communications network 100 comprises a transmitting device 101 and a receiving device 102. The transmitting device 101 may be a radio network node, such as a network node 110 described below, or a wireless device such as a wireless device 120 described below. The receiving device 102 may be a radio network node, such as a network node 110 described below, or a wireless device such as a wireless device 120 described below. In the non-limiting particular example illustrated in FIG. 3, the transmitting device 101 is the network node 110, and the receiving device is the wireless device 120.

The wireless communications network 100 comprises a plurality of network nodes whereof the network node 110 is depicted in FIG. 3. The network node 110 may be, for example, a base station such as e.g., a Base Transceiver Station (BTS), femto Base Station, MSR BS, micro BTS, pico BTS, or any other network unit capable to serve a device or a machine type communication device in a wireless communications network 100. In some particular embodiments, the network node 110 may be a stationary relay node or a mobile relay node. The wireless communications network 100 covers a geographical area which is divided into cell areas, wherein each cell area is served by a network node, although, one network node may serve one or several cells. In the examples depicted in FIG. 3, the network node 110 serves a cell 130. The network node 110 may be of different classes, such as e.g. macro, micro or pico base station, based on transmission power and thereby also cell size. Typically, wireless communications network 100 may comprise more cells similar to cell 130, served by their respective network nodes. This is not depicted in FIG. 3 for the sake of simplicity. The network node 110 may support one or several communication technologies, and its name may depend on the technology and terminology used. In 3GPP GERAN, network nodes such as the network node 110, which may be referred to as BTS or Radio Base Station (RBS), may be directly connected to one or more networks, e.g., core networks or the internet, which are not illustrated in FIG. 32. The network node 110 may be any of the nodes in these one or more networks. For example, in GSM, the network node 110 may be connected to a controlling node 140, such as a Base Station Controller (BSC) 140. The network node 110 may communicate with the controlling node 140, e.g., the BSC 140, over a link 150.

A number of wireless devices are located in the wireless communications network 100. In the example scenario of FIG. 3, only one mobile station is shown, wireless device 120. Any reference to a "user node" "mobile station" or "MS" herein is meant to comprise a reference to the wireless device 120, indistinctively, unless noted otherwise. The wireless device 120 may communicate with the network node 110 over a radio link 160.

The wireless device 120 is a wireless communication device such as a mobile station which is also known as e.g. mobile terminal, wireless terminal and/or UE. The device is wireless, i.e., it is enabled to communicate wirelessly in the wireless communication network 100, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the wireless network.

The wireless device 120 may further be referred to as a mobile telephone, cellular telephone, or laptop with wireless capability, just to mention some further examples. The wireless device 120 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a radio link in a cellular communications system.

Embodiments herein may be understood to relate to providing an improved block format in extended coverage for effective frequency offset estimation, while providing backwards compatibility. Particular embodiments herein may be understood to relate to a backwards compatible and improved block format in extended coverage for GSM/Enhanced Data rates for GSM Evolution (EDGE).

New Block Format

In order to enable effective frequency offset estimation in a receiving device, while at the same time providing backwards compatibility, in extended coverage embodiments herein may provide a new block format. The new block format provided herein will be described first to help in the understanding of the actions of the methods described later in relation to FIGS. 8 and 9.

Figure 4:
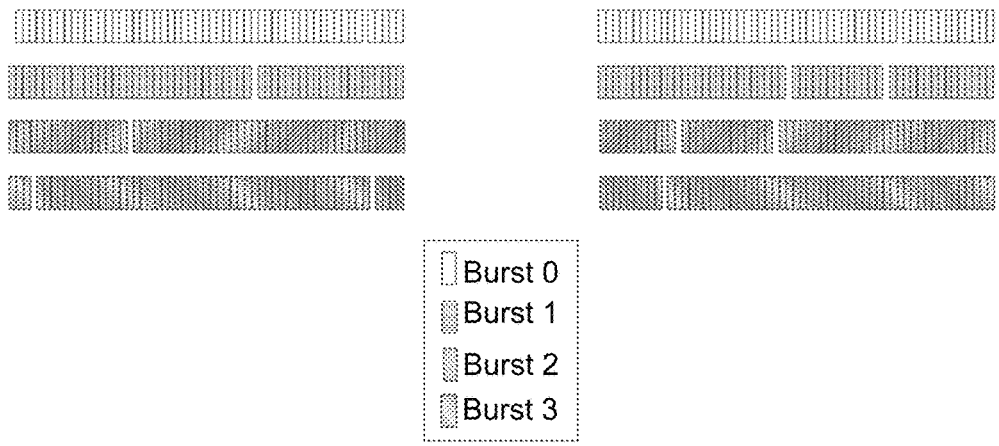
FIG. 4 is a schematic illustration of the data and header part of the current block format.

With regards to the current block format described in FIG. 1, if only the data and header part may be considered, the current block format may be represented as in FIG. 4, which is a schematic illustration of the data and header part of the current block format mapped onto the four bursts. The manner in which the bits and bursts are represented is the same as in FIG. 1. The legend of the Figure indicates the pattern chosen to represent the bits of each one of the 4 bursts, burst 0, burst 1, burst 2 and burst 3. Hence, in the current block format represented in FIG. 4, the data and header part reside in unique bit positions in the overall bursts, and the content may be different depending on the burst it is mapped to.

According to embodiments of the new block format herein, the bits carrying encoded data/header may be mapped onto one burst that may be repeated over at least four consecutive bursts to allow efficient frequency offset estimation, while the bits carrying USF and SF may be mapped over four consecutive bursts, as per legacy GPRS/EGPRS, to allow legacy MS, that is, legacy receiving devices, to read them.

Figure 5:
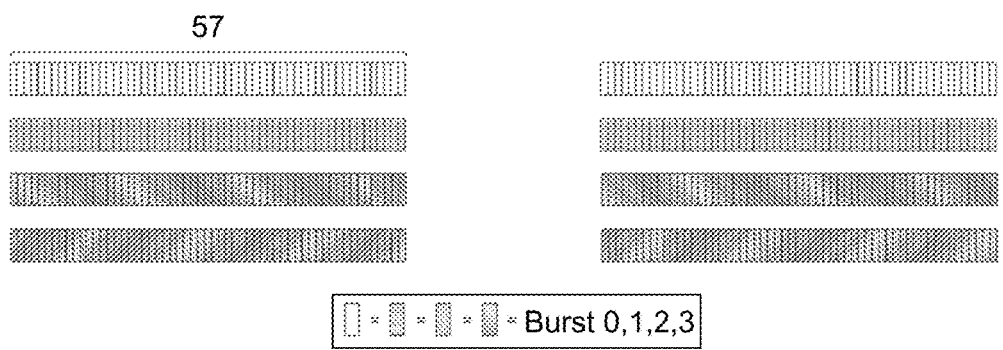
FIG. 5 is a schematic illustration of an example of the new block format, according to some embodiments.
Figure 6:
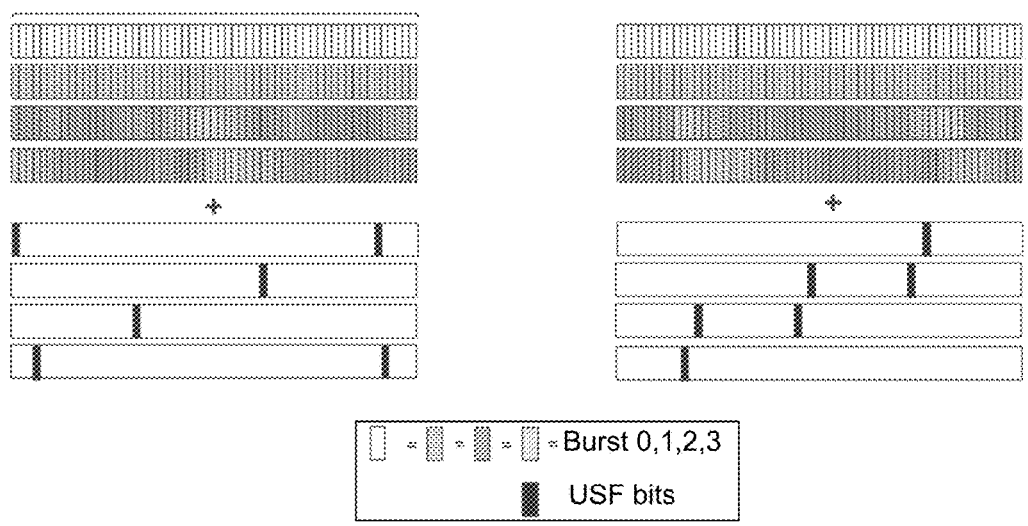
FIG. 6 is a schematic illustration of the new block format, according to some embodiments.

In order to enhance the coverage by repeating transmissions, in one example according to embodiments herein, the new block format may contain the same information in all four bursts of the radio block apart from the Stealing Flags, which may be coded and mapped as today, in the current block format. FIG. 5 is a schematic illustration of the data and header part mapped onto the four bursts according to an example of the new block format described herein. The manner in which the bits and bursts are represented is the same as in FIG. 1. The legend of the Figure indicates the pattern chosen to represent the bits carrying data and header information in each one of the 4 bursts, burst 0, burst 1, burst 2 and burst 3, which as indicated in the legend, have now the same content. FIG. 5 shows only the data and header part of the block, but as may be noted, the length per half burst may be 57, and hence the bit closest to the training sequence may still be the Stealing Flag, as in the current design, see FIG. 1. In the same example, USF bits override the bits in the positions where the USF bits currently map, see Table 1. This is shown in FIG. 6. By the fact the USF bits override the bits it is meant that the original bits may be overwritten by the USF bits.

FIG. 6 is a schematic illustration of the data and header part in an example of the new block format described herein, mapped onto the four bursts, with USF bits overriding, as indicated by the + sign, parts of the data and header bits, according to the new block format, described herein. The manner in which the bits and bursts are represented is the same as in FIG. 1. The legend of the Figure indicates the pattern chosen to represent the bits carrying data and header information each one of the 4 bursts, burst 0, burst 1, burst 2 and burst 3, which as indicated in the legend, have now the same content. In the lower half of the Figure, the USF bits are represented within empty blocks corresponding to the size of the data and header fields, to indicate the positions of the data and header bits overridden by bits from the USF field in the new block format.

As may be seen in FIG. 6, and Table 1, there may be no overlap of any of the USF bit position between the bursts, i.e., for these 12 bit positions, the accumulation of multiple transmissions may effectively be three-quarter of useful signal and one-quarter of interfering USF bits. Considering that there could be, in total, 114 bits in the burst, 57+57, deducting the 8 bits from the Stealing Flags, the performance, is not expected to be significantly impacted by overriding the USF bit positions, which only constitute 12 out of the 114 bit positions in the burst, and for each of the 12 bit positions there will still be three-quarter of useful signal (signal where USF has not been overridden) received.

Figure 7:
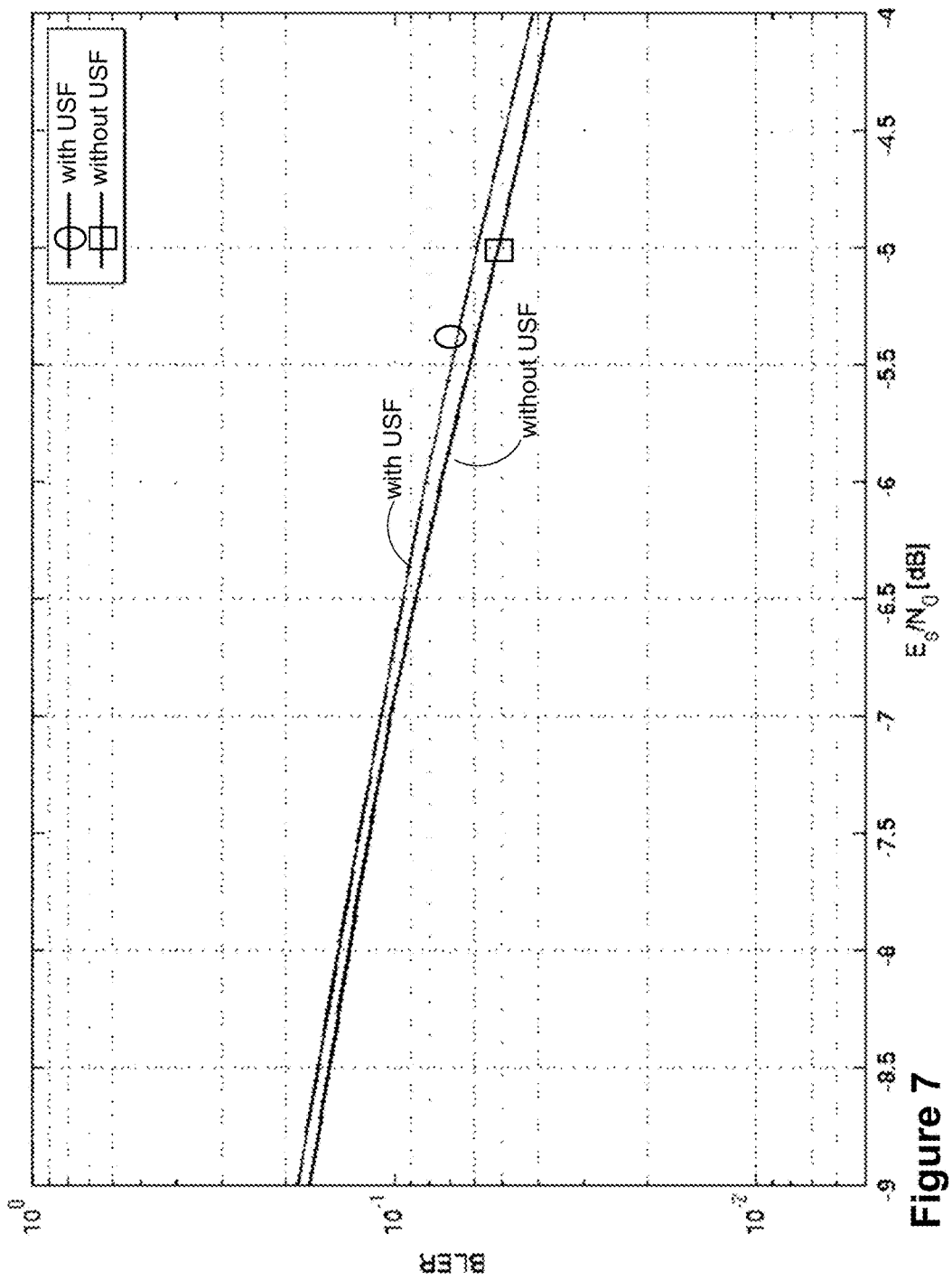
FIG. 7 is a schematic graph illustrating the impact on link level performance of data and header by overriding USF bits.

This has in fact been evaluated by link level simulations, see FIG. 7. A link level simulation may be understood as the radio link performance in terms of BLock Error Rate (BLER) versus experienced Signal to Noise Ratio (SNR). It may be seen that the degradation, which may be understood as the increase needed in SNR to achieve a constant BLER, may be limited to around 0.2 dB. FIG. 7 is a schematic graph illustrating the impact on link level performance of data and header by overriding USF bits. In FIG. 7, the x-axis shows the Signal-to-Noise ratio, measured as energy per bit to noise power spectral density ratio (Es/N0), in decibel, with the y-axis showing the BLock Error Rate (BLER) of the simulated block. Hence, if, for example, reading the figure at the same block error rate for the two different curves, the necessary increase or decrease in SNR may be obtained to maintain performance. In other words, overriding of the data bits with the USF bits does not negatively impact the Signal-to-Noise ratio.

To avoid that a legacy EGPRS MS may try to decode a block of the new format, which may be a waste of battery, the Stealing Flags may be set to a value indicating a Coding Scheme (CS) not used by EGPRS MS, i.e., CS-2 or CS-3. GPRS MS may still try to decode the block but fail due to the new format. Hence, battery in the legacy receiving devices may be saved by avoiding that they continue in trying to decode the block according to embodiments herein.

The above mentioned block design is summarized in Table 2, which is a summary of an example of the new block format disclosed herein, in comparison with a legacy block format.

TABLE 2

| Block field | Legacy block format | New block format |
|---|---|---|
| USF | Interleaved and mapped over 4 bursts. Non-overlapping with other fields | Interleaved and mapped over 4 bursts (as per legacy mapping). Fully overlapping with data and header part, with USF bits overriding the corresponding data and/or header bits |
| SF | Interleaved and mapped over 4 bursts. Non-overlapping with other fields | Interleaved and mapped over 4 bursts (as per legacy mapping). Non-overlapping with other fields |
| Data and header | Interleaved and mapped over 4 bursts. Non-overlapping with other fields | Interleaved over 1 burst but mapped (repeated) over 4 bursts. Overlapping and overridden by USF bits in different positions in each burst. |

It will be understood from Table 2, that in embodiments herein, each of the data field and the header field is interleaved over 1 burst but mapped, that is, repeated, over 4 bursts. Each of the data field and the header field is overlapping and overridden by USF bits in different positions in each burst. This is in contrast with the legacy or current block format, wherein each of the data field and the header field is interleaved and mapped over 4 bursts, and non-overlapping with other fields. Overlapping may be understood herein to refer to as overwriting the original data and header parts. The overlapping of the data and header fields by the USF bits may be understood to be partial, as shown in FIG. 6.

The new block format may ensure that the same signal is repeated using a time separation of one quarter of the current block format. With the time separation being one quarter of the current block format, the maximum frequency offset that may be estimated is four times higher than for the current block format. The maximum limit for frequency offset estimation may be due to the periodicity of the phase, which may be used to estimate the offset, i.e. $\pm 2\pi N$, where any value of integer N may result in the same phase shift.

Embodiments of a method performed by the transmitting device 101 for transmitting the block according to embodiments herein to the receiving device 102, will now be described with reference to the flowchart depicted in FIG. 8. As stated earlier, the transmitting device 101 and the receiving device 102 operate in the wireless communications network 100.

In some embodiments, the transmitting device 101 may be a BTS and the receiving device 102 may be a mobile station.

In some embodiments, the transmitting device 101 may be a mobile station and the receiving device 102 may be a BTS.

In some embodiments, the controlling node 140 may be a BSC.

Action 801

In this action, the transmitting device 101 may receive from the controlling node 140 operating in the wireless communications network 100, an indication of a block format of a block for transmission to the receiving device 102, e.g., from a plurality of block formats, the other formats comprising for example, a legacy or current block format, as described herein. The receiving may be via the link 150. Block format has been described earlier. In Action 801, the block format may comprise the new block format described in FIGS. 4 and 5. The block format may have been selected by the controlling node 140, as will be described later in Action 1001.

The indication may be for example in the form of a Stealing Flag (SF) in an RLC/MAC data block, such the EC-PDTCH in GSM.

As described in relation to FIGS. 4 and 5, the block comprises four bursts. The four bursts further comprise USF, SF, and data and header fields, as described earlier. The USF and the SF fields are interleaved and mapped over the four bursts, wherein the data and header fields are interleaved over one burst but repeated over the four bursts. The data and header fields are overlapping with and overridden by bits from the USF field in different positions in each burst.

The fact that the data and header fields are repeated over the four bursts may be understood as that, the bits carrying encoded data/header may be mapped onto one burst that may be repeated over at least four consecutive bursts, as stated earlier.

In some embodiments, the block may be a block comprising control information, such as positive and negative acknowledgments of received blocks. That, is the block format may be a control block format.

In some embodiments, the receiving 801 may further comprise receiving an indication for a selected state for the USF field in the selected block format. A state is understood herein as an identifier for a particular device to be scheduled on the UL. For example, in GSM, eight different "states" may be supported, wherein one MS may be assigned one "state", e.g., 000. The state may have been selected by e.g., the controlling node 140, depending on which wireless device the controlling node 140 may decide to schedule. The indication for the selected state for the USF field may be understood as the identifier of a scheduled receiving device, such as the receiving device 102.

In some embodiments, the wireless communications network 100 may be a network that may need to be backwards compatible while supporting the new block format for new devices, but still having an interest in that the new block format, or parts of it, may be read by legacy devices, e.g., the legacy devices may need to understand the training sequence to be able to find the block and demodulate it, and then the SF and USF bits after demodulation may need to be compatible in the placement and their bit value for legacy devices to understand it.

In accordance with this, in some embodiments, the block may be backwards compatible by the USF field being mapped over the four bursts, so that the receiving device 102, in embodiments lacking a specific configuration to support the block format, may be enabled to decode the USF carried by the block.

New MSs, such as the receiving device 102 in some embodiments, compatible with the new block format may also use SF and USF bits to, with the SF, distinguish between different block formats, and for USF, determine if they are scheduled in the UL.

Figure 8:
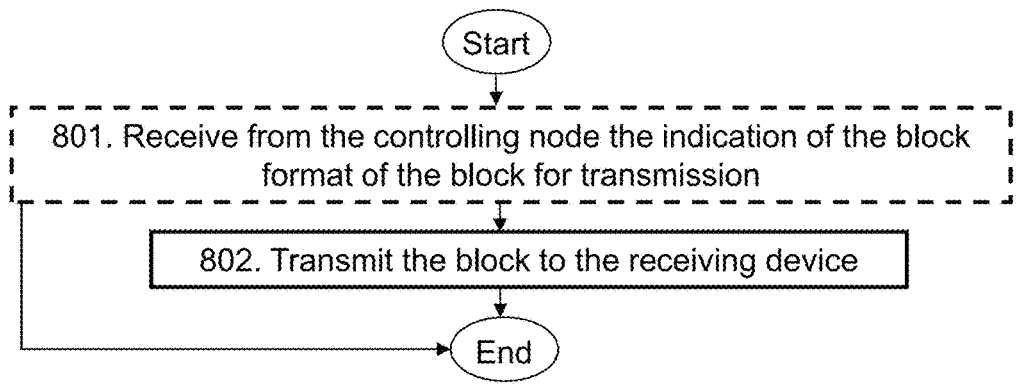
FIG. 8 is a schematic diagram illustrating embodiments of a method in a transmitting device, according to some embodiments.

Action 801 is optional, as represented in FIG. 8 by the dashed lines, since in some embodiments it may be the transmitting device 101 itself deciding which block format the block to transmit to the receiving device 102 may have.

Action 802

According to this Action 802, the transmitting device 101 transmits the block, as just described in Action 801, to the receiving device 102. Transmission may be performed e.g., via the radio link 160 by the PDTCH or the PACCH.

In short, embodiments herein may be understood as introducing a block that may be designed by using a single burst, instead of the current design of four different bursts per block, in order to allow for extended coverage and at the same time, improved frequency offset estimation.

In addition, in order to be backwards compatible with the existing block design, the following principles may be followed:

First, the burst may be repeated at minimum four times, in order to occupy the same amount of resources as the conventional block;

Second, the Stealing flags (SFs) may be spread out over all four bursts, and may be of different states depending on the bursts, out of the four, they are mapped to, to describe the type of radio block transmitted. The SFs may be spread and coded in the same manner as the conventional block to allow legacy devices to read and interpret the SFs.

Third, the USF bits may be spread out over all four bursts, and may be of different states depending on burst number. The USF bits may be spread and coded in the same manner as the conventional block—overriding bits from the data part of the 1-burst coded block—to allow legacy devices to read and interpret the USF.

Embodiments herein may be applicable to GSM. Although the overall description is provided for a control block format, the same principles may apply for other block formats, such as the one used on the packet data traffic channel.

Embodiments herein may provide the following advantages:

First, they provide superior performance in extended coverage due to the improved processing power when combining multiple transmissions due to the improved frequency offset estimation compared to a straight forward extension of current design;

Second, the design may allow for effective frequency offset estimation, which may help to optimize the performance in extended coverage and help in following transmissions/receptions by having a low frequency offset. The effective frequency offset estimation may be achieved by correlation.

Third, backwards compatibility with legacy devices multiplexed on the same resources may be maintained, by the placement of the SF and USF fields.

Embodiments of a method performed by the receiving device 102 for receiving the transmitted block from the transmitting device 101, will now be described with reference to the flowchart depicted in FIG. 9. As stated earlier, the transmitting device 101 and the receiving device 102 operate in the wireless communications network 100.

The detailed description of some of the following corresponds to the same references provided above, in relation to the actions described for the transmitting device 101, and will thus not be repeated here.

Action 901

In this action, the receiving device 102 receives the block from the transmitting device 101. The block comprises the four bursts. The four bursts further comprise USF, SF and data and header fields. The USF and the SF fields are interleaved and mapped over the four bursts. The data and header fields are interleaved over one burst but repeated over the four bursts. The data and header fields are overlapping with and overridden by bits from the USF field in different positions in each burst. The receiving may be performed e.g., via the radio link 160, by the PDTCH or the PACCH.

Action 902

In some embodiments, the receiving device 102 may decode the received block according to an indication comprised in the SF field of the received block. That is, the receiving device 102 in embodiments wherein it may be compatible with the new block format, may also use the SF bits to distinguish between different block formats. By knowing the block format of the block received in Action 901, the receiving device 102 may then identify if the block was intended for it or not, and if intended for it, avoid multiple decoding attempts assuming different block formats.

Additionally, the receiving device 102 may use the USF to determine if it is scheduled in the UL.

In other embodiments, the receiving device 102 may lack a specific configuration to support the block format. That is, in some embodiments, the receiving device 102 may be a legacy device that may not be configured to operate with a system that is more advanced than a GSM/EDGE network, Release 12. In such embodiments, the block may be backwards compatible by the USF field being mapped over the four bursts so that the receiving device 102 may be enabled to decode the USF carried by the block.

Figure 9:
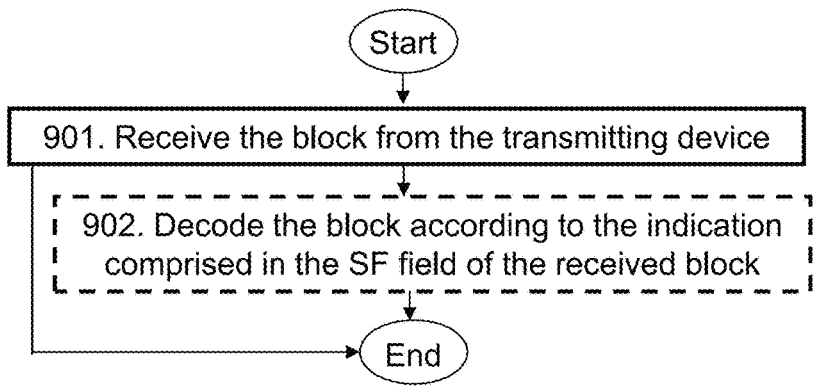
FIG. 9 is a schematic diagram illustrating actions of a method in a receiving device, according to some embodiments.

Action 902 is optional, as represented in FIG. 9 by the dashed lines.

Embodiments of a method performed by the controlling node 140 for selecting the block format for transmission by the transmitting device 101 to the receiving device 102, will now be described with reference to the flowchart depicted in FIG. 10. As stated earlier, the controlling node 140, the transmitting device 101, and the receiving device 102 operate in the wireless communications network 100.

The detailed description of some of the following corresponds to the same references provided above, in relation to the actions described for the transmitting device 101, and will thus not be repeated here.

Action 1001

In this action, the controlling node 140 selects the block format, as described in FIGS. 5 and 6, for transmission by the transmitting device 101 to the receiving device 102. The block format comprises four bursts. The four bursts further comprise USF, SF, and data and header fields. The USF and the SF fields are interleaved and mapped over the four bursts. The data and header fields are interleaved over one burst but repeated over the four bursts. The data and header fields are overlapping with and overridden by bits from the USF field in different positions in each burst.

The controlling node 140 may select the block format based on, for example, if the receiving device 102 that is to be scheduled supports the block format.

Action 1002

In some embodiments, the controlling node 140 may select a state for the USF field in the selected block, to determine which device may be scheduled in the UL.

The controlling node 140 may perform this action according to known methods.

Figure 10:
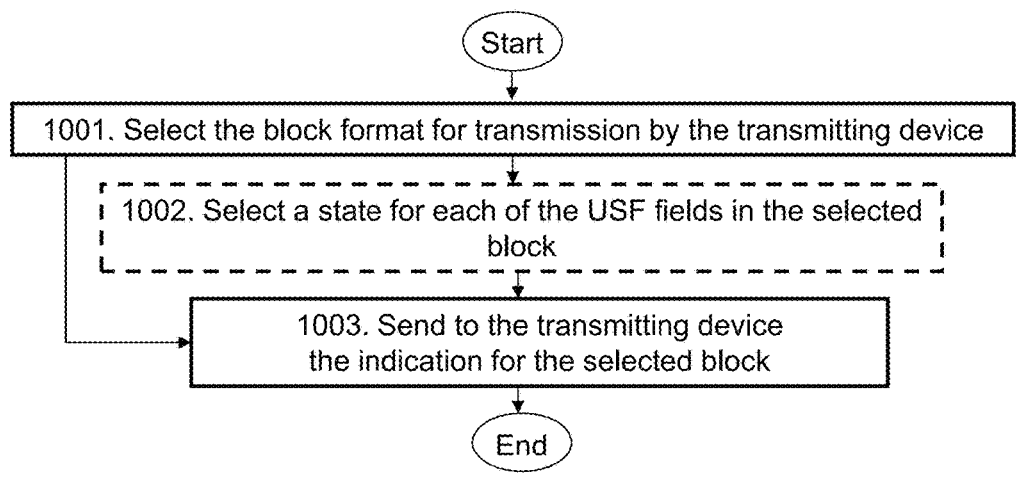
FIG. 10 is a schematic diagram illustrating actions of a method in a controlling node, according to some embodiments.

Action 1002 is optional, as represented in FIG. 10 by the dashed lines.

Action 1003

In this Action, the controlling node 140 sends, to the transmitting device 101, the indication for the selected block format. This is done so that the transmitting device 101 may know which block format to use for transmission to the receiving device 102. The sending in this Action may be done via the link 150.

As mentioned earlier, in some embodiments, the block may be backwards compatible by the USF field being mapped over the four bursts so that the receiving device 102 lacking a specific configuration to support the block format, may be enabled to decode the USF carried by the block.

To perform the method actions described above in relation to FIG. 8, the transmitting device 101 is configured to transmit the block to the receiving device 102. The transmitting device 101 comprises the following arrangement depicted in FIG. 11. As already mentioned, the transmitting device 101 and the receiving device 102 are configured to operate in the wireless communications network 100.

The detailed description of some of the following corresponds to the same references provided above, in relation to the actions described for the transmitting device 101, and will thus not be repeated here.

The transmitting device 101 is further configured to, e.g., by means of a transmitting module 1101 configured to, transmit the block to the receiving device 102, the block comprising four bursts, the four bursts further comprising USF, SF, and data and header fields, wherein the USF and the SF fields are interleaved and mapped over the four bursts, wherein the data and header fields are interleaved over one burst but repeated over the four bursts, and wherein the data and header fields are overlapping with and overridden by bits from the USF field in different positions in each burst.

The transmitting module 1101 may be a processor 1104 of the transmitting device 101.

The transmitting device 101 may be further configured to, e.g., by means of a receiving module 1102 configured to, receive from the controlling node 140 configured to operate in the wireless communications network 100, the indication of the block format of the block for transmission to the receiving device 102. The block format may have been configured to have been selected by the controlling node 140.

The receiving module 1102 may be the processor 1104 of the transmitting device 101.

In some embodiments, to receive may further comprise to receive the indication for the selected state for the USF field in the selected block format.

In some embodiments, the block may be configured to be backwards compatible by the USF field being mapped over the four bursts so that the receiving device 102 lacking a specific configuration to support the block format, may be enabled to decode the USF carried by the block.

The transmitting device 101 may be configured to perform other actions with other modules 1103 configured to perform these actions within the transmitting device 101. Each of the other modules 1103 may be the processor 1104 of the transmitting device 101, or an application running on such processor.

Figure 11:
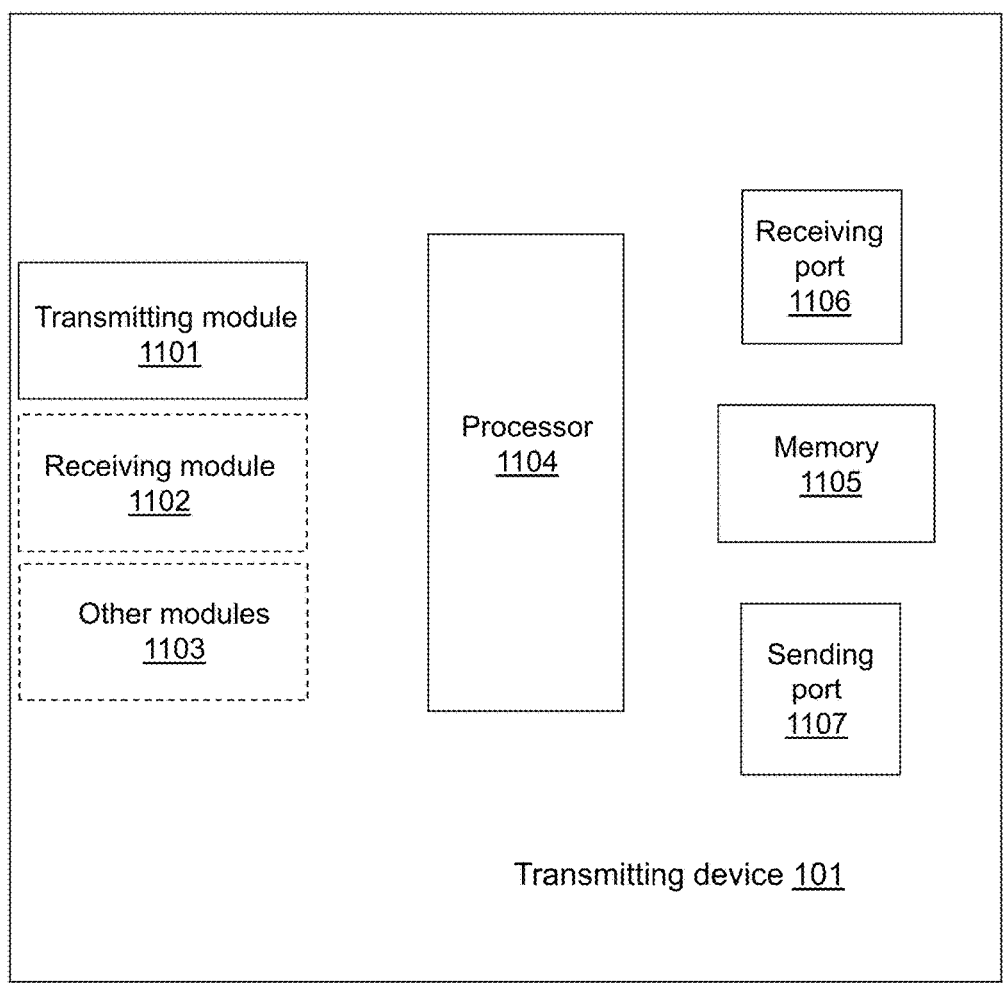
FIG. 11 is a block diagram of a transmitting device that is configured according to some embodiments.

The embodiments herein may be implemented through one or more processors, such as a processor 1104 in the transmitting device 101 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the transmitting device 101. One such carrier may be in the form of a CD ROM disc. It is however feasible with other data carriers such as a memory stick. The computer program code may furthermore be provided as pure program code on a server and downloaded to the transmitting device 101.

The transmitting device 101 may further comprise a memory 1105 comprising one or more memory units. The memory 1105 is arranged to be used to store obtained information, store data, configurations, schedulings, and applications etc. to perform the methods herein when being executed in the transmitting device 101.

In some embodiments, the transmitting device 101 may receive information through a receiving port 1106. In some embodiments, the receiving port 1106 may be, for example, connected to two or more antennas in transmitting device 101. In other embodiments, the transmitting device 101 may receive information from another structure in the wireless communications network 100 through the receiving port 1106. Since the receiving port 1106 may be in communication with the processor 1104, the receiving port 1106 may then send the received information to the processor 1104. The receiving port 1106 may also be configured to receive other information.

The processor 1104 in the transmitting device 101 may be further configured to transmit or send information to e.g., the receiving device 102 or the controlling node 140, through a sending port 1107, which may be in communication with the processor 1104 and the memory 1105.

Those skilled in the art will also appreciate that the transmitting module 1101, the receiving module 1102, and the other modules 1103 described above may refer to a combination of analog and digital modules, and/or one or more processors configured with software and/or firmware, e.g., stored in memory, that, when executed by the one or more processors such as the processor 1104, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1101-1103 described above may be implemented as one or more applications running on one or more processors such as the processor 1104.

Thus, the methods according to the embodiments described herein for the transmitting device 101 may be implemented by means of a computer program product, comprising instructions, i.e., software code portions, which, when executed on at least one processor, cause the at least one processor to carry out the actions described herein, as performed by the transmitting device 101. The computer program product may be stored on a computer-readable storage medium. The computer-readable storage medium, having stored thereon the computer program, may comprise instructions which, when executed on at least one processor, cause the at least one processor to carry out the actions described herein, as performed by transmitting device 101. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

To perform the method actions described above in relation to FIG. 9, the receiving device 102 is configured to receive the transmitted block from the transmitting device 101. The receiving device 102 comprises the following arrangement depicted in FIG. 12. As already mentioned, the transmitting device 101 and the receiving device 102 are configured to operate in the wireless communications network 100.

The detailed description of some of the following corresponds to the same references provided above, in relation to the actions described for the transmitting device 101, and will thus not be repeated here.

The first communication device 101 is further configured to, e.g., by means of a receiving module 1201 configured to, receive the block from the transmitting device 101, the block comprising four bursts, the four bursts further comprising USF, SF and data and header fields, wherein the USF and the SF fields are interleaved and mapped over the four bursts, wherein the data and header fields are interleaved over one burst but repeated over the four bursts, and wherein the data and header fields are overlapping with and overridden by the USF fields bits from the USF field in different positions in each burst.

The receiving module 1201 may be a processor 1204 of the receiving device 102.

In some embodiments, the block may be configured to be backwards compatible by the USF field being mapped over the four bursts so that the receiving device 102 lacking a specific configuration to support the block format, may be enabled to decode the USF carried by the block.

The receiving device 102 may be further configured to, e.g., by means of a decoding module 1202 configured to, decode the block according to the indication comprised in the SF field of the received block.

The decoding module 1202 may be the processor 1204 of the receiving device 102.

The receiving device 102 may be configured to perform other actions with other modules 1203 configured to perform these actions within the receiving device 102. Each of the other modules 1203 may be the processor 1204 of the receiving device 102, or an application running on such processor.

Figure 12:
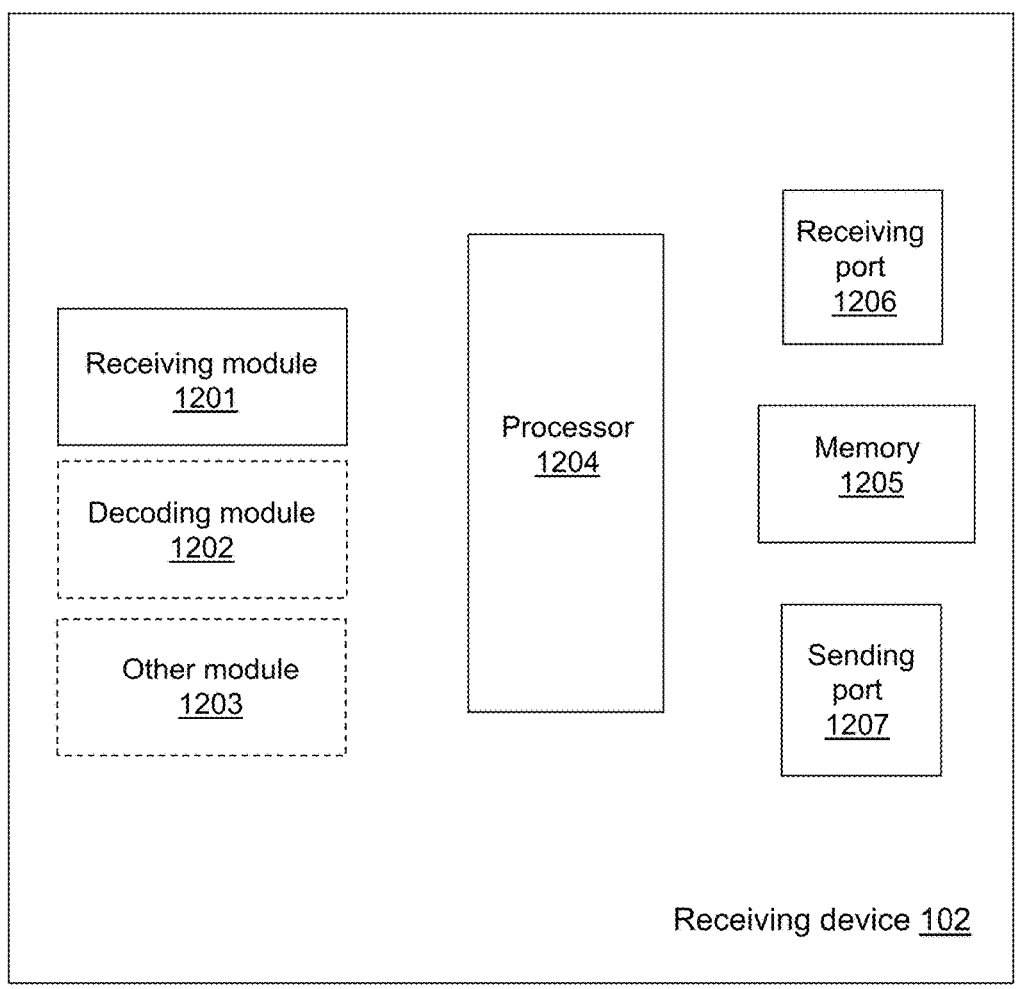
FIG. 12 is a block diagram of a receiving device that is configured according to some embodiments.

The embodiments herein may be implemented through one or more processors, such as a processor 1204 in the receiving device 102 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the in the receiving device 102. One such carrier may be in the form of a CD ROM disc. It is however feasible with other data carriers such as a memory stick. The computer program code may furthermore be provided as pure program code on a server and downloaded to the receiving device 102.

The receiving device 102 may further comprise a memory 1205 comprising one or more memory units. The memory 1205 is arranged to be used to store obtained information, store data, configurations, schedulings, and applications etc. to perform the methods herein when being executed in the receiving device 102.

In some embodiments, the receiving device 102 may receive information through a receiving port 1206. In some embodiments, the receiving port 1206 may be, for example, connected to two or more antennas in the receiving device 102. In other embodiments, the receiving device 102 may receive information from another structure in the wireless communications network 100 through the receiving port 1206. Since the receiving port 1206 may be in communication with the processor 1204, the receiving port 1206 may then send the received information to the processor 1204. The receiving port 1206 may also be configured to receive other information.

The processor 1204 in the receiving device 102 may be further configured to transmit or send information to e.g., the transmitting device 101, through a sending port 1207, which may be in communication with the processor 1204 and the memory 1205.

Those skilled in the art will also appreciate that the receiving module 1201, the decoding module 1202, and the other modules 1203 described above may refer to a combination of analog and digital modules, and/or one or more processors configured with software and/or firmware, e.g., stored in memory, that, when executed by the one or more processors such as the processor 1204, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1201-1203 described above may be implemented as one or more applications running on one or more processors such as the processor 1204.

Thus, the methods according to the embodiments described herein for the receiving device 102 may be implemented by means of a computer program product, comprising instructions, i.e., software code portions, which, when executed on at least one processor, cause the at least one processor to carry out the actions described herein, as performed by the receiving device 102. The computer program product may be stored on a computer-readable storage medium. The computer-readable storage medium, having stored thereon the computer program, may comprise instructions which, when executed on at least one processor, cause the at least one processor to carry out the actions described herein, as performed by receiving device 102. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

To perform the method actions described above in relation to FIG. 10, the controlling node 140 is configured to select the block format for transmission by the transmitting device 101 to the receiving device 102. The controlling node 140 comprises the following arrangement depicted in FIG. 13. As already mentioned, the controlling node 140, the transmitting device 101, and the receiving device 102 are configured to operate in the wireless communications network 100.

The detailed description of some of the following corresponds to the same references provided above, in relation to the actions described for the controlling node 140, and will thus not be repeated here.

The controlling node 140 is further configured to, e.g., by means of a selecting module 1301 configured to, select the block format for transmission by the transmitting device 101 to the receiving device 102, the block format comprising four bursts, the four bursts further comprising USF, SF and data and header fields, wherein the USF and the SF fields are interleaved and mapped over the four bursts, wherein the data and header fields are interleaved over one burst but repeated over the four bursts, and wherein the data and header fields are overlapping with and overridden by bits from the USF field in different positions in each burst.

The selecting module 1301 may be a processor 1304 of the controlling node 140.

In some embodiments, the block may be configured to be backwards compatible by the USF field being mapped over the four bursts so that the receiving device 102 lacking a specific configuration to support the block format, may be enabled to decode the USF carried by the block.

The controlling node 140 may be further configured to, e.g., by means of a sending module 1302 configured to, send, to the transmitting device 101, the indication for the selected block format.

The sending module 1302 may be the processor 1304 of the controlling node 140.

The controlling node 140 may be configured to perform other actions with other modules 1303 configured to perform these actions within the controlling node 140. Each of the other modules 1303 may be the processor 1304 of the controlling node 140, or an application running on such processor.

Figure 13:
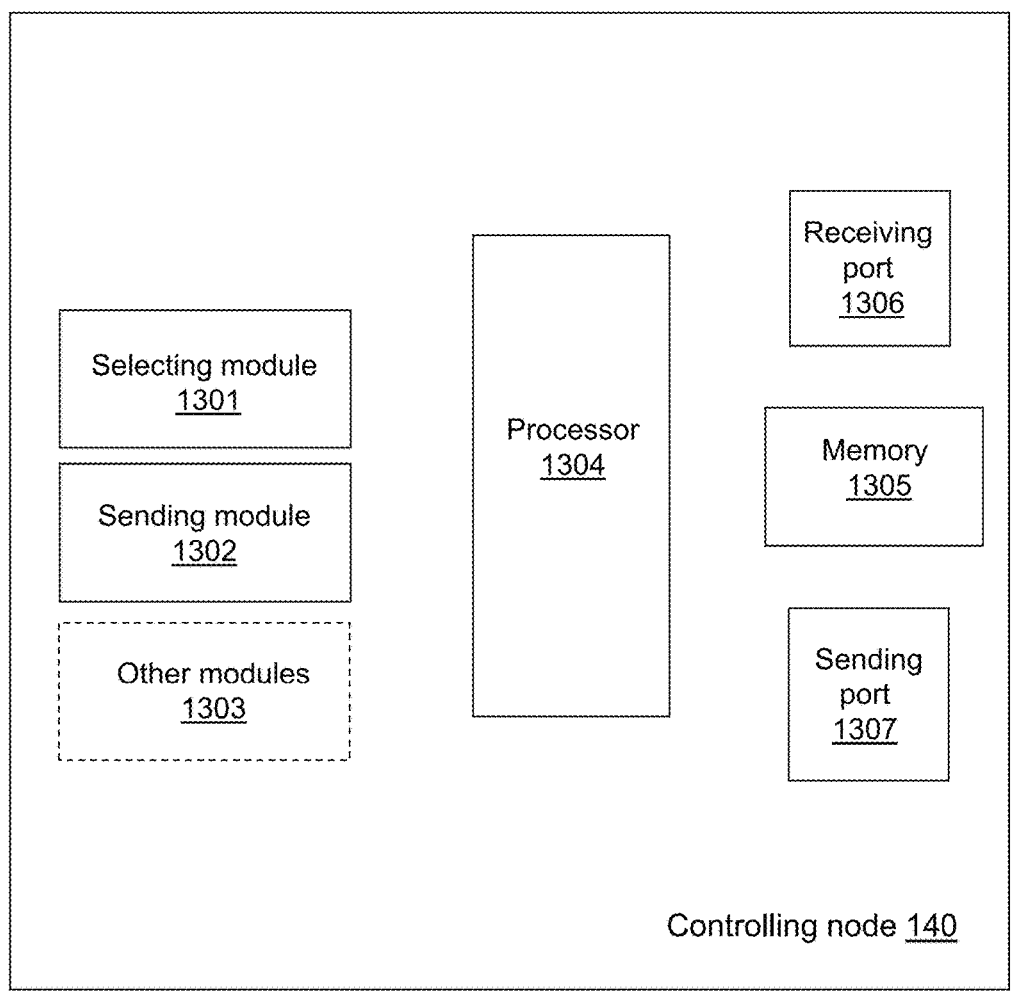
FIG. 13 is a block diagram of a controlling node that is configured according to some embodiments.

The embodiments herein may be implemented through one or more processors, such as a processor 1304 in the controlling node 140 depicted in FIG. 13, together with computer program code for performing the functions and actions of the embodiments herein. The program code mentioned above may also be provided as a computer program product, for instance in the form of a data carrier carrying computer program code for performing the embodiments herein when being loaded into the in the controlling node 140. One such carrier may be in the form of a CD ROM disc. It is however feasible with other data carriers such as a memory stick. The computer program code may furthermore be provided as pure program code on a server and downloaded to the controlling node 140.

The controlling node 140 may further comprise a memory 1305 comprising one or more memory units. The memory 1305 is arranged to be used to store obtained information, store data, configurations, schedulings, and applications etc. to perform the methods herein when being executed in the controlling node 140.

In some embodiments, the controlling node 140 may receive information through a receiving port 1306. In some embodiments, the receiving port 1306 may be, for example, connected to two or more antennas in controlling node 140. In other embodiments, the controlling node 140 may receive information from another structure in the wireless communications network 100 through the receiving port 1306. Since the receiving port 1306 may be in communication with the processor 1304, the receiving port 1306 may then send the received information to the processor 1304. The receiving port 1306 may also be configured to receive other information.

The processor 1304 in the controlling node 140 may be further configured to transmit or send information to e.g., the transmitting device 101, through a sending port 1307, which may be in communication with the processor 1304 and the memory 1305.

Those skilled in the art will also appreciate that the selecting module 1301, the sending module 1302, and the other modules 1303 described above may refer to a combination of analog and digital modules, and/or one or more processors configured with software and/or firmware, e.g., stored in memory, that, when executed by the one or more processors such as the processor 1304, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1301-1303 described above may be implemented as one or more applications running on one or more processors such as the processor 1304.

Thus, the methods according to the embodiments described herein for the controlling node 140 may be implemented by means of a computer program product, comprising instructions, i.e., software code portions, which, when executed on at least one processor, cause the at least one processor to carry out the actions described herein, as performed by the controlling node 140. The computer program product may be stored on a computer-readable storage medium. The computer-readable storage medium, having stored thereon the computer program, may comprise instructions which, when executed on at least one processor, cause the at least one processor to carry out the actions described herein, as performed by controlling node 140. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention. It is to be understood that the embodiments are not to be limited to the specific examples disclosed, and that modifications and other variants are intended to be included within the scope of this disclosure. Although specific terms may be employed herein, they are used in a generic and descriptive sense only and not for purposes of limitation.

EXAMPLES RELATED TO THE EMBODIMENTS DESCRIBED HEREIN

More specifically, the following are examples related to transmitting device related embodiments, receiving device related embodiments, and controlling node related embodiments.

The transmitting device embodiments relate to FIGS. 8 and 11.

A method performed by a transmitting device such as the transmitting device 101, e.g., the network node 110, for transmitting a block to a receiving device such as the receiving device 102, the transmitting device 101 and the receiving device 102 operating in a wireless communications network 100, may comprise the following action:

Transmitting 802 a block, such as a radio block, to the receiving device 102, the block comprising four bursts, such as radio bursts, each of the four bursts further comprising Uplink State Flag, USF, fields, Stealing Flag, SF, fields and data and header fields, wherein the USF and the SF fields are interleaved and mapped over the four bursts, wherein the data and header fields are interleaved over one burst but repeated over the four bursts, and wherein the data and header fields are overlapping and overridden by bits from the USF field in different positions in each burst. The transmitting device 101 may be configured to perform this action 802, e.g. by means of the transmitting module 1101 configured to perform this action, within the transmitting device 101. The transmitting module 1101 may be a processor 1104 of the transmitting device 101, or an application running on such processor.

In some embodiments, the method may comprise the following action:

Receiving 801 from the controlling node 140 operating in the wireless communications network 100, an indication for the block for transmission to the receiving device 102, the block having been selected by the controlling node 140, e.g., from a plurality of block formats. The transmitting device 101 may be configured to perform this action 801, e.g. by means of the receiving module 1102 configured to perform this action, within the transmitting device 101. The receiving module 1102 may be the processor 1104 of the transmitting device 101, or an application running on such processor. A format of the block may correspond to the block comprising four bursts, each of the four bursts further comprising Uplink State Flag, USF, fields, Stealing Flag, SF, fields and data and header fields, wherein the USF and the SF fields are interleaved and mapped over the four bursts, wherein the data and header fields are interleaved over one burst but repeated over the four bursts, and wherein the data and header fields are overlapping and overridden by bits from the USF field in different positions in each burst.

In action 801, the transmitting device 101 may therefore receive a selected block format corresponding to the format just described, for transmission to the receiving device 102. The selected block format may have been selected from a plurality of other formats, the other formats comprising for example, a legacy block format, as described herein. The transmitting device 101, in action 802 may then be understood to transmit the block in the block format selected by the controlling node 140. In other words, the block transmitted in action 802 corresponds to the format described, as selected by the controlling node 140.

In some embodiments, the receiving 801 may further comprise an indication for the selected state for the USF field in the selected block.

The transmitting device 101 may be configured to perform other actions with other modules 1103 configured to perform these actions within the transmitting device 101. Each of the other modules 1103 may be the processor 1104 of the transmitting device 101, or an application running on such processor.

In some embodiments, the transmitting device 101 may be a BTS and the receiving device 102 may be a mobile station.

In some embodiments, the transmitting device 101 may be a mobile station and the receiving device 102 may be a BTS.

In some embodiments, the controlling node 140 may be a BSC.

In some embodiments all the actions may be performed. In some embodiments, one or more actions may be performed. One or more embodiments may be combined, where applicable. All possible combinations are not described to simplify the description.

The transmitting device 101 may comprise an interface unit to facilitate communications between the transmitting device 101 and other nodes or devices, e.g., the receiving device 102. The interface may, for example, include a transceiver configured to transmit and receive radio signals over an air interface in accordance with a suitable standard.

The receiving device related embodiments relate to FIGS. 9 and 12.

A method performed by a receiving device such as the receiving device 102, e.g., the wireless device 120, for receiving the transmitted block from the transmitting device 101, the transmitting device 101 and the receiving device 102 operating in the wireless communications network 100, may comprise one or more of the following actions:

Receiving 901 the block from the transmitting device 101, the block comprising four bursts, each of the four bursts further comprising Uplink State Flag, USF, fields, Stealing Flag, SF, fields, and data and header fields, wherein the USF and the SF fields are interleaved and mapped over the four bursts, wherein the data and header fields are interleaved over one burst but repeated over the four bursts, and wherein the data and header fields are overlapping and overridden by bits from the USF field in different positions in each burst. The receiving device 102 may be configured to perform this action 901, e.g. by means of a receiving module 1201 configured to perform this action, within the receiving device 102. The receiving module 1201 may be a processor 1204 of the receiving device 102, or an application running on such processor. The data field may be referred to herein as the data part of the block. The header field may be referred to herein as the header part of the block;

Decoding 902 the block according to an indication comprised in the SF field of the received block. The receiving device 102 may be configured to perform this action 902, e.g. by means of a decoding module 1202 configured to perform this action, within the receiving device 102. The decoding module 1202 may be the processor 1204 of the receiving device 102, or an application running on such processor.

The receiving device 102 may be configured to perform other actions with other modules 1203 configured to perform these actions within the receiving device 102. Each of the other modules 1203 may be the processor 1204 of the receiving device 102, or an application running on such processor.

In some embodiments all the actions may be performed. In some embodiments, one or more actions may be performed. One or more embodiments may be combined, where applicable. All possible combinations are not described to simplify the description.

The receiving device 102 may comprise an interface unit to facilitate communications between the receiving device 102 and other nodes or devices, e.g., the transmitting device 101. The interface may, for example, include a transceiver configured to transmit and receive radio signals over an air interface in accordance with a suitable standard.

The controlling node related embodiments relate to FIGS. 10 and 13.

A method performed by a controlling node such as the controlling node 140, e.g., a BSC, for selecting the block for transmission by a transmitting device 101 to a receiving device 102, the controlling node 140, the transmitting device 101, and the receiving device 102 operating in the wireless communications network 100, may comprise one or more of the following actions:

Selecting 1001 the block for transmission by the transmitting device 101 to the receiving device 102, the block comprising four bursts, each of the four bursts further comprising Uplink State Flag, USF, fields, Stealing Flag, SF, fields, and data and header fields, wherein the USF and the SF fields are interleaved and mapped over the four bursts, wherein the data and header fields are interleaved over one burst but repeated over the four bursts, and wherein the data and header fields are overlapping and overridden by bits from the USF field in different positions in each burst, the block being selected, e.g., from a plurality of block formats. The controlling node 140 may be configured to perform this action 1001, e.g. by means of a selecting module 1301 configured to perform this action, within the controlling node 140. The selecting module 1301 may be a processor 1304 of the controlling node 140, or an application running on such processor;

Sending 1003, to the transmitting device 101, an indication for the selected block. The controlling node 140 may be configured to perform this action 1003, e.g. by means of a sending module 1302 configured to perform this action, within the controlling node 140. The sending module 1302 may be the processor 1304 of the controlling node 140, or an application running on such processor.

In some embodiments, the method may comprise the following action:

Selecting 1002 a state for the USF field in the selected block, and wherein the sent indication comprises an indication for the selected state for the USF field. The controlling node 140 may be configured to perform this action 1002, e.g. by means of the selecting module 1301 configured to perform this action, within the controlling node 140.

The controlling node 140 may be configured to perform other actions with other modules 1303 configured to perform these actions within the controlling node 140. Each of the other modules 1303 may be the processor 1304 of the controlling node 140, or an application running on such processor.

In some embodiments all the actions may be performed. In some embodiments, one or more actions may be performed. One or more embodiments may be combined, where applicable. All possible combinations are not described to simplify the description.

The controlling node 140 may comprise an interface unit to facilitate communications between the controlling node 140 and other nodes or devices, e.g., the transmitting device 101. The interface may, for example, include a sender configured to send and receive signals over a wired interface in accordance with a suitable standard.

What is claimed is:

1. A method performed by a receiving device configured for operation in a communications network, the method comprising:
   receiving, from a transmitting device in the communications network, four bursts comprising a block mapped according to a selected block format, wherein the block comprises a plurality of data and header bits;
   determining whether the selected block format corresponds to a first block format in which the plurality of data and header bits are repeated in a corresponding plurality of same first positions in all four bursts; and
   demodulating the plurality data and header bits based on the determination of whether the selected block format corresponds to the first block format.

2. The method of claim 1, wherein:
   the block further comprises a plurality of Stealing Flag (SF) bits; and
   determining whether the selected block format corresponds to the first block format is based on values of the SF bits.

3. The method of claim 1, wherein:
   the block further comprises a plurality of Uplink State Flag (USF) bits; and
   in the first block format, a different portion of the USF bits overrides a corresponding different portion of the plurality of data and header bits in each of the four bursts.

4. The method of claim 1, wherein if it is determined that the selected block format corresponds to the first block format, demodulating the plurality of data and header bits comprises:
   estimating a frequency offset of the receiving device, in relation to the transmitting device, based on the plurality of data and header bits received in at least one pair of consecutive bursts, of the four bursts; and
   determining a corrected plurality of data and header bits based on removing the estimated frequency offset from the plurality of data and header bits.

5. The method of claim 4, wherein estimating the frequency offset comprises determining a complex correlation between:
   the plurality of data and header bits as received in a first burst of each pair of the at least one pair of consecutive bursts; and
   the plurality of data and header bits as received, at corresponding positions, in a second burst of each pair of the at least one pair of consecutive bursts.

6. The method of claim 4, wherein if it is determined that the selected block format corresponds to the first block format, demodulating the plurality of data and header bits further comprises: accumulating each particular bit, of the corrected plurality of data and header bits, from a same position in all four bursts, wherein the same position for the particular bit is different than the respective same positions in all four bursts for the other bits comprising the corrected plurality of data and header bits.

7. The method of claim 6, wherein:
the block further comprises a plurality of Uplink State Flag (USF) bits;
in the first block format, a different portion of the USF bits overrides a corresponding different portion of the plurality of data and header bits in each of the four bursts; and
accumulating each particular bit, of the corrected plurality of data and header bits, from the same position in all four bursts comprises accumulating a corrected USF bit overriding the particular bit in any of the four bursts.

8. The method of claim 1, further comprising determining whether the selected block format corresponds to a second block format in which the each of the plurality of data and header bits is transmitted in a position, within the four bursts, that is different from the respective positions, within the four bursts, in which other bits of the plurality of data and header bits are transmitted.

9. The method of claim 8, wherein
the block further comprises a plurality of Uplink State Flag (USF) bits;
in each of the four bursts, a different portion of the USF bits overrides a corresponding different portion of the plurality of data and header bits; and
the corresponding different portions are the same for the first and second block formats.

10. The method of claim 8, wherein demodulating the data and header bits is further based on the determination of whether the selected block format corresponds to the second block format.

11. The method of claim 10, wherein if it is determined that that selected block format corresponds to the second block format and not the first block format, demodulating the plurality of data and header bits comprises:
determining a corrected plurality of data and header bits based on removing, from the plurality of data and header bits, a particular frequency offset estimated prior to receiving the four bursts comprising the block; and
accumulating each particular bit, of the corrected plurality of data and header bits, from only the position, within the four bursts, that is different from the respective positions of the other bits within the four bursts.

12. A receiving device configured for operation in a communications network, the receiving device comprising:
a receiver configured to receive, from a transmitting device in the communications network, four bursts comprising a block mapped according to a selected block format, wherein the block comprises a plurality of data and header bits;
a processor operatively associated with the receiver and configured to:
determine whether the selected block format corresponds to a first block format in which the plurality of data and header bits are repeated in a corresponding plurality of same first positions in all four bursts; and
demodulate the plurality data and header bits based on the determination of whether the selected block format corresponds to the first block format.

13. The receiving device of claim 12, wherein:
the block further comprises a plurality of Stealing Flag (SF) bits; and
the processor is configured to determine whether the selected block format corresponds to the first block format based on values of the SF bits.

14. The receiving device of claim 12, wherein:
the block further comprises a plurality of Uplink State Flag (USF) bits; and
in the first block format, a different portion of the USF bits overrides a corresponding different portion of the plurality of data and header bits in each of the four bursts.

15. The receiving device of claim 12, wherein if is determined that the selected block format corresponds to the first block format, the processor is configured to demodulate the plurality of data and header bits by:
estimating a frequency offset of the receiving device, in relation to the transmitting device, based on the plurality of data and header bits received in at least one pair of consecutive bursts, of the four bursts; and
determining a corrected plurality of data and header bits based on removing the estimated frequency offset from the plurality of data and header bits.

16. The receiving device of claim 15, wherein the processor is configured to estimate the frequency offset by determining a complex correlation between:
the plurality of data and header bits as received in a first burst of each pair of the at least one pair of consecutive bursts; and
the plurality of data and header bits as received, at corresponding positions, in a second burst of each pair of the at least one pair of consecutive bursts.

17. The receiving device of claim 15, wherein if it is determined that the selected block format corresponds to the first block format, the processor is further configured to demodulate the plurality of data and header bits by:
accumulating each particular bit, of the corrected plurality of data and header bits, from a same position in all four bursts, wherein the same position for the particular bit is different than the respective same positions in all four bursts for the other bits comprising the corrected plurality of data and header bits.

18. The receiving device of claim 17, wherein:
the block further comprises a plurality of Uplink State Flag (USF) bits;
in the first block format, a different portion of the USF bits overrides a corresponding different portion of the plurality of data and header bits in each of the four bursts; and
the processor is configured to accumulate each particular bit, of the corrected plurality of data and header bits, from the same position in all four bursts by accumulating a corrected USF bit overriding the particular bit in any of the four bursts.

19. The receiving device of claim 12, wherein the processor is further configured to determine whether the selected block format corresponds to a second block format in which the each of the plurality of data and header bits is transmitted in a position, within the four bursts, that is different from the respective positions, within the four bursts, in which other bits of the plurality of data and header bits are transmitted.

20. The receiving device of claim 19, wherein
the block further comprises a plurality of Uplink State Flag (USF) bits;
in each of the four bursts, a different portion of the USF bits overrides a corresponding different portion of the plurality of data and header bits; and
the corresponding different portions are the same for the first and second block formats.

21. The receiving device of claim 20, wherein the processor is further configured to demodulate the data and header bits based on the determination of whether the selected block format corresponds to the second block format.

22. The receiving device of claim 21, wherein if it is determined that that selected block format corresponds to the second block format and not the first block format, the processor is configured to demodulate the plurality of data and header bits by:
determining a corrected plurality of data and header bits based on removing, from the plurality of data and header bits, a particular frequency offset estimated prior to receiving the four bursts comprising the block; and
accumulating each particular bit, of the corrected plurality of data and header bits, from only the position, within the four bursts, that is different from the respective positions of the other bits within the four bursts.

* * * * *